US011597882B2

(12) United States Patent
Xu et al.

(10) Patent No.: US 11,597,882 B2
(45) Date of Patent: Mar. 7, 2023

(54) CO-PROCESSING OF BIOMASS OIL IN COKER

(71) Applicant: ExxonMobil Technology and Engineering Company, Annandale, NJ (US)

(72) Inventors: Xiaochun Xu, Basking Ridge, NJ (US); Hyung R. Kim, Basking Ridge, NJ (US); Meghan E. Pierson, Houston, TX (US); William J. Novak, Bedminster, NJ (US); Kirsten E. Schutt, Houston, TX (US); Ross Mabon, Whitehall, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/454,809

(22) Filed: Nov. 13, 2021

(65) Prior Publication Data
US 2022/0169928 A1    Jun. 2, 2022

Related U.S. Application Data

(60) Provisional application No. 63/119,929, filed on Dec. 1, 2020.

(51) Int. Cl.
*C10G 9/00* (2006.01)
*C10G 1/00* (2006.01)

(52) U.S. Cl.
CPC ............. *C10G 9/005* (2013.01); *C10G 1/002* (2013.01); *C10G 2300/1014* (2013.01); *C10G 2300/1077* (2013.01)

(58) Field of Classification Search
CPC ....... C10B 55/00; C10B 55/10; C10B 57/045; C10B 57/06; C10G 1/002;
(Continued)

(56) References Cited

U.S. PATENT DOCUMENTS 8,603,325 B2    12/2013  Siskin et al.
2010/0024283 A1  2/2010  Portilho et al.
(Continued)

FOREIGN PATENT DOCUMENTS

JP    2007231119 A  *  9/2007

OTHER PUBLICATIONS

JP2007231119A—Bib Translated (Year: 2007).*
(Continued)

*Primary Examiner* — Ellen M McAvoy
*Assistant Examiner* — Chantel L Graham
(74) *Attorney, Agent, or Firm* — Shook, Hardy & Bacon L.L.P.

(57) ABSTRACT

Systems and methods are provided for co-processing of biomass oil with mineral coker feeds in a coking environment. The coking can correspond to any convenient type of coking, such as delayed coking or fluidized coking. The biomass oil can correspond to biomass oil with a molar ratio of oxygen to carbon of 0.24 or less on a dry basis. Such types of biomass oil can be formed from pyrolysis methods such as hydrothermal pyrolysis, and are in contrast to biomass oils formed from pyrolysis methods such as fast pyrolysis. By using a biomass oil with a molar ratio of oxygen to carbon of 0.24 or less, improved yields of light coker gas oil can be achieved in conjunction with a reduction in the yield of heavy coker gas oil.

19 Claims, 2 Drawing Sheets

(58) Field of Classification Search
CPC .... C10G 2300/1011; C10G 2300/1014; C10G 2300/1077; C10G 2400/06; C10G 9/005; Y02E 50/10; Y02P 20/145; Y02P 30/20
See application file for complete search history.

(56) References Cited

U.S. PATENT DOCUMENTS

| | | |
|---|---|---|
| 2011/0233042 A1 | 9/2011 | Siskin et al. |
| 2015/0152334 A1* | 6/2015 | Thakur .................. C10G 55/02 202/105 |
| 2018/0371323 A1 | 12/2018 | Elkasabi et al. |

OTHER PUBLICATIONS

JP2007231119A—Claims Translated (Year: 2007).*
JP2007231119A—Description Translated (Year: 2007).*
Beims et al., "Co-Processing of Thermal Cracking Bio-Oil at Petroleum Refineries", http://dx.doi.org/10.5419/bjpg2017-009. vol. 11, No. 2, Jul. 18, 2017, table 1, figure 2.
PCT/US2021/072394 International Search Report and Written Opinion dated Mar. 4, 2022.

* cited by examiner

CO-PROCESSING OF BIOMASS OIL IN COKER

CROSS-REFERENCE TO RELATED APPLICATIONS

This application is related to and claims the benefit of priority to U.S. Provisional Application No. 63/119,929 filed Dec. 1, 2020, which is herein incorporated by reference in its entirety.

FIELD OF THE INVENTION

Systems and methods are provided for co-processing of biomass oil during a coking process.

BACKGROUND OF THE INVENTION

Lignocellulosic biomass is a renewable, abundantly available, and low-cost resource that is potentially a sustainable feedstock for production of biofuels. One option for production of biofuels is to first pyrolyze the lignocellulosic biomass to form pyrolysis oil, and then use additional processing to form fuel products and/or fuel blending products. Unfortunately, pyrolysis oils can include both substantial amounts of water and a variety of contaminants, such as metals. The presence of water and contaminants can adversely impact any refinery processes that are used for conversion of the pyrolysis oil into fuels. While additional upgrading steps can be used to improve the pyrolysis oil (such as stages for water removal and metals removal) prior to introducing the pyrolysis oil into existing refinery processes, such additional upgrading steps can add substantial additional cost. Thus, it would be desirable to have systems and methods for effectively processing pyrolysis oils while reducing or minimizing both additional dedicated processing stages and reducing or minimizing the impact on existing refinery processes.

Coking processes are commonly used in refineries as a method for converting feedstocks, without requiring additional hydrogen, to produce lower boiling fractions suitable for use as fuels. Various types of coking configurations can be used, including delayed coking and fluidized coking. Typical feedstocks can correspond to vacuum resid fractions and/or other fractions that would require substantial quantities of hydrogen to upgrade using conventional hydroprocessing methods. Coking can generate naphtha and distillate boiling range products from such vacuum resid fractions without requiring the addition of hydrogen to the reaction environment. However, coking processes can also convert substantial portions of a feed into coke. This is a constraint on the potential yield of products from coking.

U.S. Pat. No. 8,603,325 describes methods for co-processing of pyrolysis oil in a coking environment. The methods include co-processing the pyrolysis oil with a vacuum resid feed in a delayed coking or fluidized coking environment. Pyrolysis oil derived from a fast pyrolysis process is described as a preferred type of pyrolysis oil based on the higher pyrolysis oil yields from a fast pyrolysis process.

U.S. Patent Application Publication 2010/0024283 describes co-processing of various types of raw biomass and vegetable oils in a delayed coking environment.

SUMMARY OF THE INVENTION

In an aspect, a method for co-processing biomass is provided. The method includes exposing a biomass oil comprising an oxygen to carbon molar ratio of 0.10 to 0.24 on a dry basis and a feedstock including a vacuum resid boiling range fraction to a catalyst in a reactor under coking conditions to form one or more liquid product fractions. The biomass oil can correspond to 5.0 wt % or more of a combined weight of the biomass oil and the feedstock. Optionally, the biomass oil can have a hydrogen to carbon molar ratio of 1.2 or more and/or an effective molar ratio of hydrogen to carbon of 0.7 or more. In some aspects, the method can further include converting a biomass feed under pyrolysis conditions to form the biomass oil. Examples of pyrolysis conditions can include hydrothermal pyrolysis conditions, hydropyrolysis conditions, catalytic pyrolysis conditions, or a combination thereof.

DETAILED DESCRIPTION OF THE INVENTION

Figure 1:
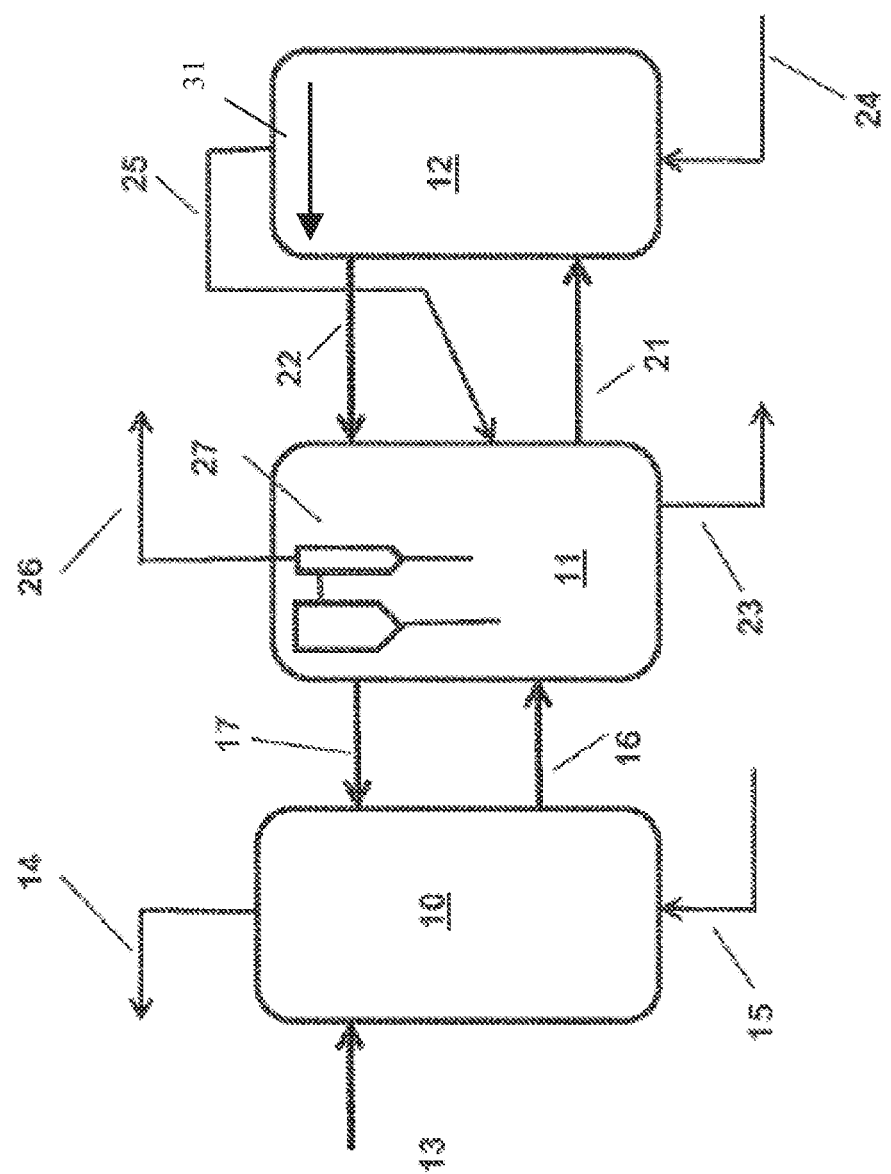
FIG. 1 shows an example of a fluidized bed coking system including a coker, a heater, and a gasifier.

All numerical values within the detailed description and the claims herein are modified by "about" or "approximately" the indicated value, and take into account experimental error and variations that would be expected by a person having ordinary skill in the art.

Overview

In various aspects, systems and methods are provided for co-processing of biomass oil with mineral coker feeds in a coking environment. The coking can correspond to any convenient type of coking, such as delayed coking or fluidized coking. The biomass oil can correspond to biomass oil with a molar ratio of oxygen to carbon of 0.24 or less on a dry basis. Such types of biomass oil can be formed from pyrolysis methods such as hydrothermal pyrolysis, and are in contrast to biomass oils formed from pyrolysis methods such as fast pyrolysis. By using a biomass oil with a molar ratio of oxygen to carbon of 0.24 or less, improved yields of light coker gas oil can be achieved in conjunction with a reduction in the yield of heavy coker gas oil. Light coker gas oil corresponds to roughly to an atmospheric distillate boiling range product, while heavy coker gas oil roughly corresponds to an atmospheric bottoms product. The increased selectivity for light coker gas oil in place of heavy coker gas oil results in a higher value product, as light coker gas oils generally require less additional processing than heavy coker gas oils in order to make desirable fuel products.

Coking is generally a favorable process for upgrading of challenged feedstocks. Coking does not require addition of hydrogen. Additionally, the coking reactor and/or the coking process can accommodate feeds that have a wide variety and amount of impurities. For example, feeds with relatively high metals contents can be processed via coking, as the coking process does not include catalysts that can be poisoned or deactivated. The metals are instead removed as part of the coke product that is generated during coking.

One of the difficulties with using coking to upgrade feeds is the tendency of coking processes to make larger volumes of low value products. In addition to coke, coking can also make substantial quantities of coker gas oil. As the boiling range for a coker gas oil increases, the coker gas oil becomes less valuable. This is due in part to the need to spend additional resources to upgrade heavier coker gas oils, even though the resulting "upgraded" product may still be relatively low value due to the boiling range. Alternatively, if too much processing is required to transform a heavier coker gas oil, the cost for generating a higher value product may exceed the increase in value that is achieved.

It has been discovered that biomass oils (i.e., pyrolysis oils) that have a sufficiently low ratio of oxygen to carbon can be used to enhance the selectivity for formation of light coker gas oil when biomass oil is co-processed in a coker with a mineral and/or conventional coker feedstock. Additionally, it has been discovered that co-processing a conventional and/or mineral coker feedstock with biomass oil that has a sufficiently low ratio of oxygen to carbon can provide a corresponding decrease in selectivity for formation of heavy coker gas oil. Thus, co-processing of a biomass oil with a low ratio of oxygen to carbon in a coker can allow for production of higher value products during coking. This increased selectivity for light coker gas oil at the expense of heavy coker gas oil can be achieved when processing a feedstock that includes a mineral and/or conventional portion and 5.0 wt % to 70 wt % of biomass oil, or 5.0 wt % to 50 wt %, or 10 wt % to 70 wt %, or 10 wt % to 50 wt %.

Biomass oils tend to primarily correspond to distillate and gas oil boiling range compounds. This is in contrast to conventional coker feedstocks, which tend to be primarily composed of vacuum resid boiling range compounds. Because the starting boiling range of biomass oils is lower, it might be expected that the yield of the heaviest fractions from coking would be slightly reduced when co-processing with biomass oils, due to dilution of a heavier (higher boiling) conventional feed with the lower boiling biomass oil. However, during co-processing of biomass oil with a mineral and/or conventional coker feedstock, a synergistic increase in formation of light coker gas oil instead of heavy coker gas oil has been unexpectedly observed. It is noted that the selectivity for coker naphtha is also increased during such co-processing.

Co-processing of biomass oil in a coker can also provide other advantages. For example, biomass oil often includes metals that could be catalyst poisons if the biomass oil is introduced into a catalytic processing environment. For example, a biomass oil (derived from pyrolysis of biomass) can include 10 wppm or more of one or more alkali metals, one or more alkaline earth metals, iron, and/or phosphorus. In a coking environment, such metals are incorporated into the coke product and can be handled in a conventional manner. Additionally, it is believed that the phenols and/or phenolic compounds in biomass oil can reduce coke drying times by inhibiting free radical formation within the coke.

Definitions

In this discussion, a biomass conversion product corresponds to any product generated by exposure of biomass to a pyrolysis conversion process, such as catalytic pyrolysis, fast pyrolysis, hydropyrolysis, or hydrothermal pyrolysis.

In this discussion, a quantity calculated "on a dry basis" is defined as calculating a quantity without considering any water that may be present in a sample. Thus, determining the oxygen to carbon molar ratio of a pyrolysis oil "on a dry basis" means that any water present in the pyrolysis oil is not included in the calculation of the oxygen to carbon ratio.

In this discussion, "biomass oil" or "pyrolysis oil" is defined as any conversion products from a biomass conversion process that would be liquid phase at 20° C. and 100 kPa-a. Thus, under this definition, "biomass oil" is a product from pyrolysis of biomass.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

In some aspects, another option for identifying a desirable biomass oil for coking can be based on the effective ratio of hydrogen to carbon. The effective ratio of hydrogen to carbon can take into account the amount of oxygen that is present in a biomass sample. The effective ratio of hydrogen to carbon is defined based on the molar quantities of hydrogen, carbon, and oxygen present in a biomass sample. The effective ratio of hydrogen is carbon is defined herein as $[<H>-2*<O>]/<C>$, where $<H>$, $<O>$, and $<C>$ refer to the molar quantities of hydrogen, oxygen, and carbon respectively in the biomass.

In various aspects, reference may be made to one or more types of fractions generated during distillation of a petroleum feedstock. Such fractions can be defined based on a boiling range, such as a boiling range that includes at least ~90 wt % of the fraction, or at least ~95 wt % of the fraction. For example, for coker naphtha fractions, at least ~90 wt % of the fraction, or at least ~95 wt %, can have a boiling point in the range of ~85° F. (~29° C.) to ~356° F. (~180° C.). For a light coker gas oil fraction, at least ~90 wt % of the fraction, and preferably at least ~95 wt %, can have a boiling point in the range of ~356° F. (~180° C.) to ~653° F. (~345° C.). For a heavy coker gas oil fraction, at least ~90 wt % of the fraction, and preferably at least ~95 wt %, can have a boiling point greater than ~653° F. (~345° C.). Additionally, a vacuum resid fraction is defined as a fraction that include components having a boiling point of 566° C. or higher. Thus, a feedstock including a vacuum resid fraction can include 566° C.+components. It is noted that a fraction does not have to pass through a separation stage based on boiling point (such as a distillation column) for a fraction to be within the above definitions.

Feedstocks for Co-Processing

In various aspects, a portion of a feed for co-processing in a coker can correspond to biomass oil that is formed by conversion (pyrolysis) of biomass. The biomass used as feed for a biomass conversion process can be any convenient type of biomass. Some forms of biomass can include direct forms of biomass, such as algae biomass, cellulosic biomass, and/or plant biomass. It is noted that plant biomass can include biomass forms such as agriculture residue and forest residue. Other forms of biomass may correspond to waste products, such as food waste, animal waste, paper, and/or other waste products originally formed from biomass materials. In this discussion, municipal solid waste is included within the definition of biomass, even though a portion of the solids in municipal solid waste may not strictly correspond to solids derived from biomass. Some examples of suitable biomass sources can include woody biomass and switchgrass. More generally, examples of biomass can include, but are not limited to, wood, wood residues, sawdust, slash bark, thinnings (including pre-commercial thinnings and tree residue), forest cullings, bagasse, corn fiber, corn stover, empty fruit, bunches (EFB), fronds, palm fronds, flax, straw, low-ash straw, energy crops, palm oil, non-food-based biomass materials, crop residue, slash, annual covercrops, switchgrass, miscanthus, cellulosic containing components, cellulosic components of separated yard waste, cellulosic components of separated food waste, cellulosic components of separated municipal solid waste (MSW), or combinations thereof. Cellulosic biomass, for example, includes biomass derived from or containing cellulosic materials. In some aspects, the biomass may be one characterized as being compliant with renewable fuel standard program (RFS) regulations, or a biomass suitable for preparing a cellulosic-renewable identification number-compliant fuel. For example, the biomass can be compliant with the biomass materials specified in the pathways for a D-code 1, 2, 3, 4, 5, 6, or 7-compliant fuel, in accordance with the U.S. renewable fuel standard program (RFS) regulations.

In some aspects, the biomass can correspond to lignocellulosic biomass. Lignocellulosic biomass refers to biomass that includes at least a portion of lignin and/or cellulose as part of the biomass. Plant biomass is an example of lignocellulosic biomass. In some aspects, the lignin content of the biomass can be 20 wt % or more, or 35 wt % or more, such as up to having a feed that is substantially entirely composed of lignin and/or cellulose.

In addition to carbon, oxygen, and hydrogen, depending on the form of the biomass, other heteroatoms may be present such as nitrogen, phosphorus, sulfur, and/or various metals. Biomass can generally have a molar ratio of hydrogen to carbon of 2:1 or less, but that is typically accompanied by a substantial amount of oxygen. Thus, conversion of biomass without using additional hydrogen typically results in production of liquid products (e.g., biomass oil) with hydrogen to carbon molar ratios substantially below 2:1. In some aspects, the molar ratio of hydrogen to carbon of biomass oil used as a co-feed in coking can be 1.2 or more, or 1.4 or more, such as 1.2 to 2.0, or 1.2 to 1.8, or 1.4 to 2.0, or 1.4 to 1.8. Additionally or alternately, in some aspects biomass oil used as co-feed in coking can have an effective hydrogen to carbon ratio of 0.7 to 1.8, or 0.7 to 1.5.

In aspects where the biomass is introduced into a reaction environment at least partially as solids, having a small particle size can facilitate transport of the solids into the reactor or other reaction environment. In some instances, smaller particle size can potentially also contribute to achieving a desired level of conversion of the biomass under the short residence time conditions. Thus, one or more optional physical processing steps can be used to prepare solid forms of biomass for conversion. In such optional aspects, the solids can be crushed, chopped, ground, or otherwise physically processed to reduce the median particle size to 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

Biomass oil can be formed from biomass using any convenient conversion process that does not involve substantial addition of $H_2$ to the conversion environment. Various types of pyrolysis processes are some examples of biomass conversion processes. This can include, but is not limited to, fast pyrolysis, catalytic pyrolysis, hydropyrolysis, and hydrothermal pyrolysis (sometimes referred to as hydrothermal liquefaction).

Hydrothermal pyrolysis is a process where biomass is exposed to an aqueous reaction environment at temperatures between 250° C. to 550° C. and pressures of roughly 5 MPa-a to 25 MPa-a. In many instances, a catalyst, is also included in the reaction environment, such as an alkali metal catalyst. The biomass is exposed to the aqueous reaction environment under the hydrothermal pyrolysis conditions for a period of 10 minutes to 60 minutes. The resulting products (such as biomass oil) can then be separated from the aqueous environment.

Another type of conversion process can be a fast pyrolysis process. During pyrolysis, the biomass is exposed to temperatures of 450° C. to 600° C. in a substantially $O_2$-free environment. The biomass oil can then be condensed from the resulting vapors formed by the pyrolysis process. A variation on a fast pyrolysis process can be a catalytic fast pyrolysis process. The catalyst in a catalytic fast pyrolysis process can be, for example, an acidic catalyst, such as a silica catalyst, an alumina catalyst, or a zeolite catalyst. Catalytic fast pyrolysis can be used to increase the rate of conversion of the biomass to products.

The biomass conversion process can generate at least a light gas product and biomass oil. Many types of conversion processes can also generate char or other solid products formed primarily from carbon. The biomass oil can generally correspond to $C_{5+}$ hydrocarbonaceous compounds that are formed during the biomass conversion process, although other compounds could be present if they are liquid at 20° C. and 100 kPa-a. The oxygen content of the biomass oil can vary depending on the nature of the conversion process used to form the biomass. For example, the oxygen content of pyrolysis oil derived from fast pyrolysis can be as high as 35 wt % (or possibly still higher) on dry basis. Preferably, a pyrolysis method can be used that produces a somewhat lower oxygen content, so that the molar ratio of oxygen to carbon in the pyrolysis oil (on a dry basis) is 0.10 to 0.24, or 0.12 to 0.24, or 0.10 to 0.20, or 0.12 to 0.20. In some aspects, the oxygen content of the biomass oil can be between 1.0 wt % to 20 wt %, or 1.0 wt % and 15 wt %, or 4.0 wt % to 20 wt %, or 4.0 wt % to 15 wt %, or 6.0 wt % to 20 wt %, or 6.0 wt % to 15 wt %.

After forming biomass oil, the biomass oil can be co-processed with another feedstock, such as a feed that substantially boils in the vacuum resid boiling range. Relative to the combined feed for co-processing, the biomass oil can correspond to 1.0 wt % to 75 wt % of the combined feed, or 1.0 wt % to 50 wt %, or 1.0 wt % to 50 wt %, or 1.0 wt % to 10 wt %, or 2.5 wt % to 75 wt %, or 2.5 wt % to 50 wt %, or 2.5 wt % to 50 wt %, or 2.5 wt % to 10 wt %, or 5.0 wt % to 75 wt %, or 5.0 wt % to 50 wt %, or 5.0 wt % to 30 wt %, or 10 wt % to 75 wt %, or 10 wt % to 50 wt %, or 10 wt % to 30 wt %, or 25 wt % to 75 wt %, or 25 wt % to 50 wt %, or 50 wt % to 75 wt %.

In various aspects, coking can be used to co-process a feed corresponding to a mixture of a conventional coker feedstock and a plastic waste feedstock. The conventional coker feedstock can correspond to one or more types of petroleum and/or renewable feeds with a suitable boiling range for processing in a coker. In some aspects, the coker feedstock for co-processing can correspond to a relatively high boiling fraction, such as a heavy oil feed. For example, the coker feedstock portion of the feed can have a T10 distillation point of 343° C. or more, or 371° C. or more. Examples of suitable heavy oils for inclusion in the coker feedstock include, but are not limited to, reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from 5 to 50 wt. %. In some preferred aspects, the feed is a petroleum vacuum residuum.

Some examples of conventional petroleum chargestock suitable for processing in a delayed coker or fluidized bed coker can have a composition and properties within the ranges set forth below in Table 1.

TABLE 1

| Example of Coker Feedstock | | |
| --- | --- | --- |
| Conradson Carbon | 5 to 40 | wt. % |
| API Gravity | −10 to 35° | |
| Boiling Point | 340° C.+ to 650° C.+ | |
| Sulfur | 1.5 to 8 | wt. % |
| Hydrogen | 9 to 11 | wt. % |
| Nitrogen | 0.2 to 2 | wt. % |
| Carbon | 80 to 86 | wt. % |
| Metals | 1 to 2000 | wppm |

In addition to petroleum chargestocks, renewable feedstocks derived from biomass having a suitable boiling range can also be used as part of the coker feed. Such renewable feedstocks include feedstocks with a T10 boiling point of 340° C. or more and a T90 boiling point of 600° C. or less. An example of a suitable renewable feedstock derived from biomass can be a pyrolysis oil feedstock derived at least in part from biomass.

Coking Conditions-Fluidized Coking

Coking processes in modern refinery settings can typically be categorized as delayed coking or fluidized bed coking. Fluidized bed coking is a petroleum refining process in which heavy petroleum feeds, typically the non-distillable residues (resids) from the fractionation of heavy oils are converted to lighter, more useful products by thermal decomposition (coking) at elevated reaction temperatures, typically 480° C. to 590° C., (~900° F. to 1100° F.) and in most cases from 500° C. to 550° C. (~930° F. to 1020° F.). Heavy oils which may be processed by the fluid coking process include heavy atmospheric resids, petroleum vacuum distillation bottoms, aromatic extracts, asphalts, and bitumens from tar sands, tar pits and pitch lakes of Canada (Athabasca, Alta.), Trinidad, Southern California (La Brea (Los Angeles), McKittrick (Bakersfield, Calif.), Carpinteria (Santa Barbara County, Calif.), Lake Bermudez (Venezuela) and similar deposits such as those found in Texas, Peru, Iran, Russia and Poland. Such feeds can be co-processed with biomass oil. The biomass oil and conventional feed can be introduced separately, or the biomass oil and conventional feed can be mixed prior to introduction into the coking environment. The biomass oil and/or conventional feed can be introduced into the coking environment in a conventional manner.

The Flexicoking™ process, developed by Exxon Research and Engineering Company, is a variant of the fluid coking process that is operated in a unit including a reactor and a heater, but also including a gasifier for gasifying the coke product by reaction with an air/steam mixture to form a low heating value fuel gas. A stream of coke passes from the heater to the gasifier where all but a small fraction of the coke is gasified to a low-BTU gas (~120 BTU/standard cubic feet) by the addition of steam and air in a fluidized bed in an oxygen-deficient environment to form fuel gas comprising carbon monoxide and hydrogen. In a conventional Flexicoking™ configuration, the fuel gas product from the gasifier, containing entrained coke particles, is returned to the heater to provide most of the heat required for thermal cracking in the reactor with the balance of the reactor heat requirement supplied by combustion in the heater. A small amount of net coke (about 1 percent of feed) is withdrawn from the heater to purge the system of metals and ash. The liquid yield and properties are comparable to those from fluid coking. The fuel gas product is withdrawn from the heater following separation in internal cyclones which return coke particles through their diplegs.

Figure 2:
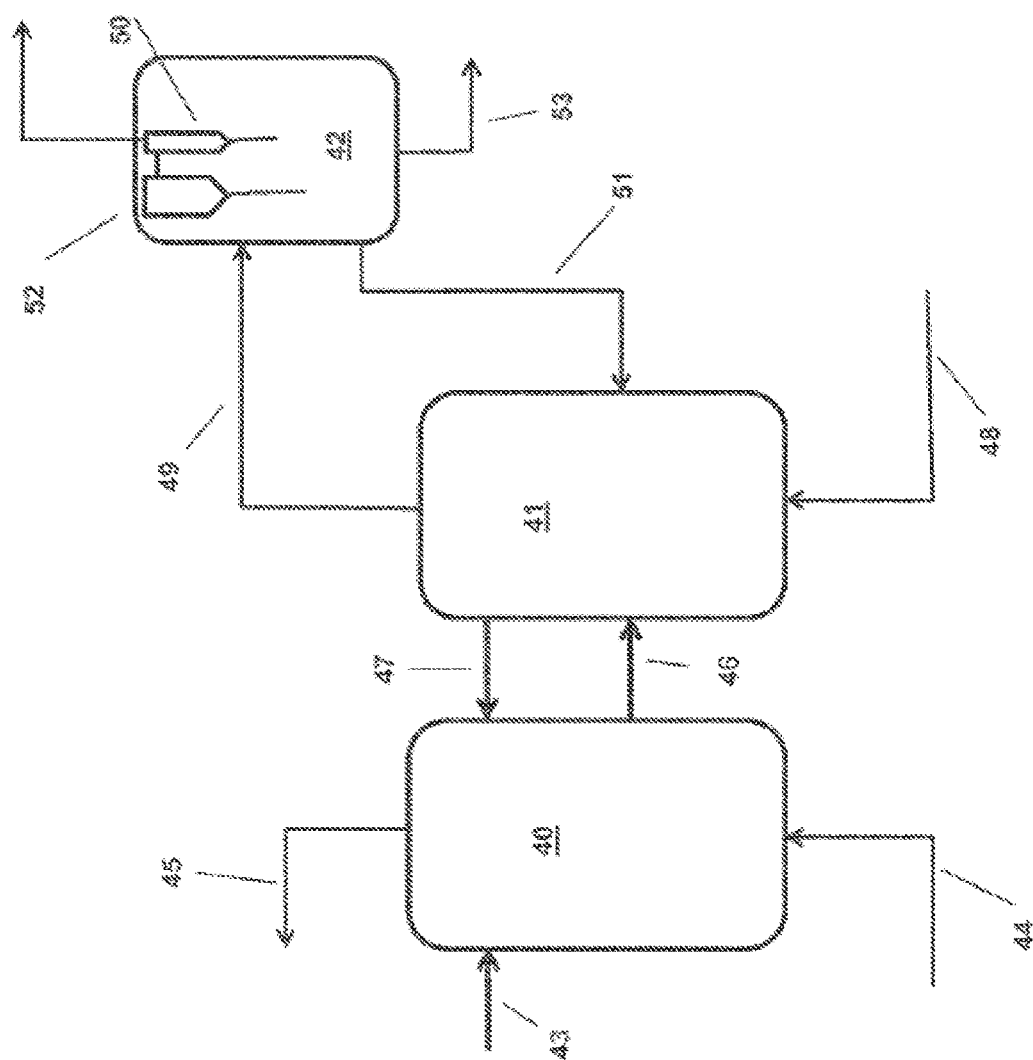
FIG. 2 shows an example of a fluidized bed coking system including a coker and a gasifier.

In this description, the term "Flexicoking" (trademark of ExxonMobil Research and Engineering Company) is used to designate a fluid coking process in which heavy petroleum feeds are subjected to thermal cracking in a fluidized bed of heated solid particles to produce hydrocarbons of lower molecular weight and boiling point along with coke as a by-product which is deposited on the solid particles in the fluidized bed. The resulting coke can then converted to a fuel gas by contact at elevated temperature with steam and an oxygen-containing gas in a gasification reactor (gasifier). This type of configuration can more generally be referred to as an integration of fluidized bed coking with gasification. FIGS. 1 and 2 provide examples of fluidized coking reactors that include a gasifier.

FIG. 1 shows an example of a Flexicoker unit (i.e., a system including a gasifier that is thermally integrated with a fluidized bed coker) with three reaction vessels: reactor, heater and gasifier. The unit comprises reactor section 10 with the coking zone and its associated stripping and scrubbing sections (not separately indicated), heater section 11 and gasifier section 12. The relationship of the coking zone, scrubbing zone and stripping zone in the reactor section is shown, for example, in U.S. Pat. No. 5,472,596, to which reference is made for a description of the Flexicoking unit and its reactor section. A heavy oil feed is introduced into the unit by line 13 and cracked hydrocarbon product withdrawn through line 14. Fluidizing and stripping steam is supplied by line 15. Cold coke is taken out from the stripping section at the base of reactor 10 by means of line 16 and passed to heater 11. The term "cold" as applied to the temperature of the withdrawn coke is, of course, decidedly relative since it is well above ambient at the operating temperature of the stripping section. Hot coke is circulated from heater 11 to reactor 10 through line 17. Coke from heater 11 is transferred to gasifier 12 through line 21 and hot, partly gasified particles of coke are circulated from the gasifier back to the heater through line 22. The excess coke is withdrawn from the heater 11 by way of line 23. In conventional configurations, gasifier 12 is provided with its supply of steam and air by line 24 and hot fuel gas is taken from the gasifier to the heater though line 25. In some alternative aspects, instead of supplying air via a line 24 to the gasifier 12, a stream of oxygen with 95 vol % purity or more can be provided, such as an oxygen stream from an air separation unit. In such aspects, in addition to supplying a stream of oxygen, a stream of an additional diluent gas can be supplied by line 31. The additional diluent gas can correspond to, for example, $CO_2$ separated from the fuel gas generated during the gasification. The fuel gas is taken out from the unit through line 26 on the heater; coke fines are removed from the fuel gas in heater cyclone system 27 comprising serially connected primary and secondary cyclones with diplegs which return the separated fines to the fluid bed in the heater. The fuel gas from line 26 can then undergo further processing. For example, in some aspects, the fuel gas from line 26 can be passed into a separation stage for separation of $CO_2$ (and/or $H_2S$). This can result in a stream with an increased concentration of synthesis gas, which can then be passed into a conversion stage for conversion of synthesis gas to methanol.

It is noted that in some optional aspects, heater cyclone system 27 can be located in a separate vessel (not shown) rather than in heater 11. In such aspects, line 26 can withdraw the fuel gas from the separate vessel, and the line 23 for purging excess coke can correspond to a line transporting coke fines away from the separate vessel. These coke fines and/or other partially gasified coke particles that are vented from the heater (or the gasifier) can have an increased content of metals relative to the feedstock. For example, the weight percentage of metals in the coke particles vented from the system (relative to the weight of the vented particles) can be greater than the weight percent of metals in the feedstock (relative to the weight of the feedstock). In other words, the metals from the feedstock are concentrated in the vented coke particles. Since the gasifier conditions do not create slag, the vented coke particles correspond to the mechanism for removal of metals from the coker/gasifier environment. In some aspects, the metals can correspond to a combination of nickel, vanadium, and/or iron. Additionally or alternately, the gasifier conditions can cause substantially no deposition of metal oxides on the interior walls of the gasifier, such as deposition of less than 0.1 wt % of the metals present in the feedstock introduced into the coker/gasifier system, or less than 0.01 wt %.

In configurations such as FIG. 1, the system elements shown in the figure can be characterized based on fluid communication between the elements. For example, reactor section 10 is in direct fluid communication with heater 11. Reactor section 10 is also in indirect fluid communication with gasifier 12 via heater 11.

As an alternative, integration of a fluidized bed coker with a gasifier can also be accomplished without the use of an intermediate heater. In such alternative aspects, the cold coke from the reactor can be transferred directly to the gasifier. This transfer, in almost all cases, will be unequivocally direct with one end of the tubular transfer line connected to the coke outlet of the reactor and its other end connected to the coke inlet of the gasifier with no intervening reaction vessel, i.e. heater. The presence of devices other than the heater is not however to be excluded, e.g. inlets for lift gas etc. Similarly, while the hot, partly gasified coke particles from the gasifier are returned directly from the gasifier to the reactor this signifies only that there is to be no intervening heater as in the conventional three-vessel Flexicoker™ but that other devices may be present between the gasifier and the reactor, e.g. gas lift inlets and outlets.

FIG. 2 shows an example of integration of a fluidized bed coker with a gasifier but without a separate heater vessel. In the configuration shown in FIG. 2, the cyclones for separating fuel gas from catalyst fines are located in a separate vessel. In other aspects, the cyclones can be included in gasifier vessel 41.

In the configuration shown in FIG. 2, the configuration includes a reactor 40, a main gasifier vessel 41 and a separator 42. The heavy oil feed is introduced into reactor 40 through line 43 and fluidizing/stripping gas through line 44; cracked hydrocarbon products are taken out through line 45.

Cold, stripped coke is routed directly from reactor 40 to gasifier 41 by way of line 46 and hot coke returned to the reactor in line 47. Steam and oxygen are supplied through line 48. The flow of gas containing coke fines is routed to separator vessel 42 through line 49 which is connected to a gas outlet of the main gasifier vessel 41. The fines are separated from the gas flow in cyclone system 50 comprising serially connected primary and secondary cyclones with diplegs which return the separated fines to the separator vessel. The separated fines are then returned to the main gasifier vessel through return line 51 and the fuel gas product taken out by way of line 52. Coke is purged from the separator through line 53. The fuel gas from line 52 can then undergo further processing for separation of $CO_2$ (and/or $H_2S$) and conversion of synthesis gas to methanol.

The coker and gasifier can be operated according to the parameters necessary for the required coking processes. Thus, the heavy oil feed will typically be a heavy (high boiling) reduced petroleum crude; petroleum atmospheric distillation bottoms; petroleum vacuum distillation bottoms, or residuum; pitch; asphalt; bitumen; other heavy hydrocarbon residues; tar sand oil; shale oil; or even a coal slurry or coal liquefaction product such as coal liquefaction bottoms. Such feeds will typically have a Conradson Carbon Residue (ASTM D189-165) of at least 5 wt. %, generally from 5 to 50 wt. %. Preferably, the feed is a petroleum vacuum residuum.

Fluidized coking is carried out in a unit with a large reactor containing hot coke particles which are maintained in the fluidized condition at the required reaction temperature with steam injected at the bottom of the vessel with the average direction of movement of the coke particles being downwards through the bed. The heavy oil feed is heated to a pumpable temperature, typically in the range of 350° C. to 400° C. (~660° F. to 750° F.), mixed with atomizing steam, and fed through multiple feed nozzles arranged at several successive levels in the reactor. Steam is injected into a stripping section at the bottom of the reactor and passes upwards through the coke particles descending through the dense phase of the fluid bed in the main part of the reactor above the stripping section. Part of the feed liquid coats the coke particles in the fluidized bed and is subsequently cracked into layers of solid coke and lighter products which evolve as gas or vaporized liquid. The residence time of the feed in the coking zone (where temperatures are suitable for thermal cracking) is on the order of 1 to 30 seconds. Reactor pressure is relatively low in order to favor vaporization of the hydrocarbon vapors which pass upwards from dense phase into dilute phase of the fluid bed in the coking zone and into cyclones at the top of the coking zone where most of the entrained solids are separated from the gas phase by centrifugal force in one or more cyclones and returned to the dense fluidized bed by gravity through the cyclone diplegs. The mixture of steam and hydrocarbon vapors from the reactor is subsequently discharged from the cyclone gas outlets into a scrubber section in a plenum located above the coking zone and separated from it by a partition. It is quenched in the scrubber section by contact with liquid descending over sheds. A pumparound loop circulates condensed liquid to an external cooler and back to the top shed row of the scrubber section to provide cooling for the quench and condensation of the heaviest fraction of the liquid product. This heavy fraction is typically recycled to extinction by feeding back to the coking zone in the reactor.

During a fluidized coking process, the heavy oil feed, pre-heated to a temperature at which it is flowable and pumpable, is introduced into the coking reactor towards the top of the reactor vessel through injection nozzles which are constructed to produce a spray of the feed into the bed of fluidized coke particles in the vessel. Temperatures in the coking zone of the reactor are typically in the range of 450° C. to 650° C. and pressures are kept at a relatively low level, typically in the range of 0 kPag to 700 kPag (~0 psig to 100 psig), and most usually from 35 kPag to 320 kPag (~5 psig to 45 psig), in order to facilitate fast drying of the coke particles, preventing the formation of sticky, adherent high molecular weight hydrocarbon deposits on the particles which could lead to reactor fouling. In some aspects, the temperature in the coking zone can be 450° C. to 600° C., or 450° C. to 550° C. The conditions can be selected so that a desired amount of conversion of the feedstock occurs in the fluidized bed reactor. For example, the conditions can be selected to achieve at least 10 wt % conversion relative to 343° C. (or 371° C.), or at least 20 wt % conversion relative 343° C. (or 371° C.), or at least 40 wt % conversion relative to 343° C. (or 371° C.), such as up to 80 wt % conversion or possibly still higher. The light hydrocarbon products of the coking (thermal cracking) reactions vaporize, mix with the fluidizing steam and pass upwardly through the dense phase of the fluidized bed into a dilute phase zone above the dense fluidized bed of coke particles. This mixture of vaporized hydrocarbon products formed in the coking reactions flows upwardly through the dilute phase with the steam at superficial velocities of roughly 1 to 2 meters per second (~3 to 6 feet per second), entraining some fine solid particles of coke which are separated from the cracking vapors in the reactor cyclones as described above. In aspects where steam is used as the fluidizing agent, the weight of steam introduced into the reactor can be selected relative to the weight of feedstock introduced into the reactor. For example, the mass flow rate of steam into the reactor can correspond to 6.0% of the mass flow rate of feedstock, or 8.0% or more, such as up to 10% or possibly still higher. The amount of steam can potentially be reduced if an activated light hydrocarbon stream is used as part of the stripping and/or fluidizing gas in the reactor. In such aspects, the mass flow rate of steam can correspond to 6.0% of the mass flow rate of feedstock or less, or 5.0% or less, or 4.0% or less, or 3.0% or less. Optionally, in some aspects, the mass flow rate of steam can be still lower, such as corresponding to 1.0% of the mass flow rate of feedstock or less, or 0.8% or less, or 0.6% or less, such as down to substantially all of the steam being replaced by the activated light hydrocarbon stream. The cracked hydrocarbon vapors pass out of the cyclones into the scrubbing section of the reactor and then to product fractionation and recovery.

In a general fluidized coking process, the coke particles formed in the coking zone pass downwards in the reactor and leave the bottom of the reactor vessel through a stripper section where they are exposed to steam in order to remove occluded hydrocarbons. The solid coke from the reactor, consisting mainly of carbon with lesser amounts of hydrogen, sulfur, nitrogen, and traces of vanadium, nickel, iron, and other elements derived from the feed, passes through the stripper and out of the reactor vessel to a burner or heater where it is partly burned in a fluidized bed with air to raise its temperature from 480° C. to 700° C. (~900° F. to 1300° F.) to supply the heat required for the endothermic coking reactions, after which a portion of the hot coke particles is recirculated to the fluidized bed reaction zone to transfer the heat to the reactor and to act as nuclei for the coke formation. The balance is withdrawn as coke product. The net coke yield is only about 65 percent of that produced by delayed coking.

For a coking process that includes a gasification zone, the cracking process proceeds in the reactor, the coke particles pass downwardly through the coking zone, through the stripping zone, where occluded hydrocarbons are stripped off by the ascending current of fluidizing gas (steam). They then exit the coking reactor and pass to the gasification reactor (gasifier) which contains a fluidized bed of solid particles and which operates at a temperature higher than that of the reactor coking zone. In the gasifier, the coke particles are converted by reaction at the elevated temperature with steam and an oxygen-containing gas into a fuel gas comprising carbon monoxide and hydrogen.

The gasification zone is typically maintained at a high temperature ranging from 850° C. to 1000° C. (~1560° F. to 1830° F.) and a pressure ranging from 0 kPag to 1000 kPag (~0 psig to 150 psig), preferably from 200 kPag to 400 kPag (~30 psig to 60 psig). Steam and an oxygen-containing gas are introduced to provide fluidization and an oxygen source for gasification. In some aspects the oxygen-containing gas can be air. In other aspects, the oxygen-containing gas can have a low nitrogen content, such as oxygen from an air separation unit or another oxygen stream including 95 vol % or more of oxygen, or 98 vol % or more, are passed into the gasifier for reaction with the solid particles comprising coke deposited on them in the coking zone. In aspects where the oxygen-containing gas has a low nitrogen content, a separate diluent stream, such as a recycled $CO_2$ or $H_2S$ stream derived from the fuel gas produced by the gasifier, can also be passed into the gasifier.

In the gasification zone the reaction between the coke and the steam and the oxygen-containing gas produces a hydrogen and carbon monoxide-containing fuel gas and a partially gasified residual coke product. Conditions in the gasifier are selected accordingly to generate these products. Steam and oxygen rates (as well as any optional $CO_2$ rates) will depend upon the rate at which cold coke enters from the reactor and to a lesser extent upon the composition of the coke which, in turn will vary according to the composition of the heavy oil feed and the severity of the cracking conditions in the reactor with these being selected according to the feed and the range of liquid products which is required. The fuel gas product from the gasifier may contain entrained coke solids and these are removed by cyclones or other separation techniques in the gasifier section of the unit; cyclones may be internal cyclones in the main gasifier vessel itself or external in a separate, smaller vessel as described below. The fuel gas product is taken out as overhead from the gasifier cyclones. The resulting partly gasified solids are removed from the gasifier and introduced directly into the coking zone of the coking reactor at a level in the dilute phase above the lower dense phase.

In some aspects, the coking conditions can be selected to provide a desired amount of conversion relative to 343° C. Typically a desired amount of conversion can correspond to 10 wt % or more, or 50 wt % or more, or 80 wt % or more, such as up to substantially complete conversion of the feedstock relative to 343° C.

The volatile products from the coke drum are conducted away from the process for further processing. For example, volatiles can be conducted to a coker fractionator for distillation and recovery of coker gases, coker naphtha, light gas oil, and heavy gas oil. Such fractions can be used, usually, but not always, following upgrading, in the blending of fuel and lubricating oil products such as motor gasoline, motor diesel oil, fuel oil, and lubricating oil. Upgrading can include separations, heteroatom removal via hydrotreating and non-hydrotreating processes, de-aromatization, solvent extraction, and the like. The process is compatible with processes where at least a portion of the heavy coker gas oil present in the product stream introduced into the coker fractionator is captured for recycle and combined with the fresh feed (coker feed component), thereby forming the coker heater or coker furnace charge. The combined feed ratio ("CFR") is the volumetric ratio of furnace charge (fresh feed plus recycle oil) to fresh feed to the continuous delayed coker operation. Delayed coking operations typically employ recycles of 5 vol % to 35% vol % (CFRs of about 1.05 to about 1.35). In some instances there can be no recycle and sometimes in special applications recycle can be up to 200%.

Coking Conditions-Delayed Coking

Delayed coking is a process for the thermal conversion of heavy oils such as petroleum residua (also referred to as "resid") to produce liquid and vapor hydrocarbon products and coke. Delayed coking of resids from heavy and/or sour (high sulfur) crude oils is carried out by converting part of the resids to more valuable hydrocarbon products. The resulting coke has value, depending on its grade, as a fuel (fuel grade coke), electrodes for aluminum manufacture (anode grade coke), etc.

Generally, a residue fraction, such as a petroleum residuum feed is pumped to a pre-heater where it is pre-heated, such as to a temperature from 480° C. to 520° C. In various aspects, co-processing can be performed by mixing a conventional and/or mineral feedstock with biomass oil prior to pumping the combined feed into the pre-heater.

The pre-heated feed is conducted to a coking zone, typically a vertically-oriented, insulated coker vessel, e.g., drum, through an inlet at the base of the drum. Pressure in the drum is usually relatively low, such as 15 psig (~100 kPa-g) to 80 psig (~550 kPa-g), or 15 psig (~100 kPa-g) to 35 psig (~240 kPa-g) to allow volatiles to be removed overhead. Typical operating temperatures of the drum will be between roughly 400° C. to 445° C., but can be as high as 475° C. The hot feed thermally cracks over a period of time (the "coking time") in the coke drum, liberating volatiles composed primarily of hydrocarbon products that continuously rise through the coke bed, which consists of channels, pores and pathways, and are collected overhead. The volatile products are conducted to a coker fractionator for distillation and recovery of coker gases, gasoline boiling range material such as coker naphtha, light gas oil, and heavy gas oil. In an embodiment, a portion of the heavy coker gas oil present in the product stream introduced into the coker fractionator can be captured for recycle and combined with the fresh feed (coker feed component), thereby forming the coker heater or coker furnace charge. In addition to the volatile products, the process also results in the accumulation of coke in the drum. When the coke drum is full of coke, the heated feed is switched to another drum and hydrocarbon vapors are purged from the coke drum with steam. The drum is then quenched with water to lower the temperature down to 200° F. (~95° C.) to 300° F. (~150° C.), after which the water is drained. When the draining step is complete, the drum is opened and the coke is removed by drilling and/or cutting using high velocity water jets ("hydraulic decoking").

EXAMPLE 1

Feeds for Co-Processing

In the following examples, a vacuum resid feedstock is co-processed in a pilot scale fluidized coker with two types of biomass oil in varying amounts. Coking of just the vacuum resid feedstock is also described for comparison.

Table 2 shows the properties of a vacuum residue (resid) feed that was used in the examples. The petroleum feed used in these examples was a light, low viscosity resid with low metals content. Light vacuum residues are those with lower coking tendencies, as indicated by wt % Conradson Carbon (CCR). The lines for "KV80" and "KV100" refer to kinematic viscosity at 80° C. and 100° C., respectively. The values shown in Table 2 below can be determined using a suitable ASTM method. For the distillation values in Table 2, a procedure similar to ASTM D2887 was used, but with modifications to allow for simulated distillation of higher boiling components.

TABLE 2

| Vacuum Resid Properties | | |
|---|---|---|
| Properties | Unit | |
| Gravity | API | 15.2 |
| CCR | wt % | 9.46 |
| Carbon | wt % | 87.4 |
| Hydrogen | wt % | 11.8 |
| Nitrogen | wt % | 0.31 |
| Sulfur | wt % | 0.487 |
| KV80 | cSt | 839 |
| KV100 | cSt | 262 |
| n-heptane insolubles | wt % | 1.1 |
| Metals | | |
| Nickel | wppm | 10 |
| Vanadium | wppm | 13 |
| Calcium | wppm | 15 |
| Sodium | wppm | 20 |
| Distillation | | |
| IBP (wt %) | 465 (° C.) | |
| 5 | 530 | |
| 10 | 554 | |
| 20 | 578 | |
| 30 | 595 | |
| 40 | 610 | |
| 50 | 626 | |
| 60 | 642 | |
| 70 | 662 | |
| 80 | 689 | |
| 90 | 725 | |

In these examples, two types of pyrolysis oil were used. One type of pyrolysis oil was made via hydrothermal pyrolysis. A second type of pyrolysis oil was made via fast pyrolysis. The resulting pyrolysis oils are shown in Table 3. The lines for "H/C" and "O/C" refer to hydrogen to carbon molar ratio and oxygen to carbon molar ratio, respectively. Additionally, for further comparison, Table 3 shows pyrolysis oils made using a catalytic pyrolysis method and a hydropyrolysis method.

TABLE 3

Pyrolysis Oil Properties

| | Unit | Hydrothermal Pyrolysis Oil | Fast Pyrolysis Oil | Catalytic Pyrolysis Oil | Hydro Pyrolysis Oil |
|---|---|---|---|---|---|
| Oxygen (Excl oxygen from water) | wt % | 12.3 | 23.7 | 19.4 | 2.2 |
| Carbon | wt % | 75.9 | 43.9 | 66.2 | 85.3 |
| Hydrogen (Excl hydrogen from water) | wt % | 8.3 | 4.2 | 6.8 | 11.4 |
| Sulfur | wt % | 0.0084 | <0.0003 | <0.1 | 0.01 |
| Nitrogen | wt % | 0.16 | <0.1 | 0.2 | 0.06 |
| H/C | mol/mol | 1.31 | 1.15 | 1.23 | 1.61 |
| O/C | mol/mol | 0.12 | 0.40 | 0.22 | 0.02 |
| Water | wt % | 3.6 | 22.5 | 7.4 | 1.0 |

As shown in Table 3, the biomass oils generated by the different types of pyrolysis processes have a number of differences. First, the oxygen content of the fast pyrolysis oil is substantially higher than the oxygen content of the other pyrolysis oils. This contributes to the wide variation in the oxygen to carbon molar ratio between the different types of biomass oil. Additionally, the fast pyrolysis oil has a substantially higher water content than the other types of pyrolysis oil. It is further noted that the sulfur and nitrogen contents of the fast pyrolysis oil are lower than the corresponding sulfur and nitrogen contents of the other types of pyrolysis oil. Conventionally, the lower sulfur and nitrogen content of the fast pyrolysis oil, in combination with the higher yield generated by fast pyrolysis, would make the fast pyrolysis oil a desirable choice for co-processing.

EXAMPLE 2

Fluidized Coking for Co-Processing of Biomass Oil

The vacuum resid feed and biomass oil feeds described in Example 1 were exposed to Flexicoking conditions (a type of fluid coking, as described above) in a pilot scale reactor. In a first set of runs, the vacuum resid feed was processed alone. In a second set of runs, the vacuum resid feed was blended with biomass oil from hydrothermal pyrolysis to form feedstocks containing either 10 wt % or 20 wt % of the biomass oil from hydrothermal pyrolysis. In a third set of runs, the vacuum resid feed was blended with biomass oil from fast pyrolysis to form feedstocks containing either 5 wt % or 10 wt % of the biomass oil from fast pyrolysis.

Table 4 shows a comparison of results from coking the vacuum resid feed, a feedstock including 10 wt % of the biomass oil from hydrothermal pyrolysis (balance vacuum resid), and a feedstock including 10 wt % of the biomass oil from fast pyrolysis (balance vacuum resid). The first column in Table 4 shows the total liquid hydrocarbonaceous product yield from the coking runs. The remaining columns show the percentage of the total liquid product that corresponds to coker naphtha, light coker gas oil, and heavy coker gas oil.

TABLE 4

Products from Co-Processing of Pyrolysis Oil

| | Liquid yield, wt % on Feed | Coker Naphtha | Light Coker Gas Oil | Heavy Coker Gas Oil |
|---|---|---|---|---|
| 100% vacuum resid | 85.7 | 2.7 | 11.5 | 85.8 |
| 10 wt % hydrothermal pyrolysis oil | 85.1 | 3.35 | 19.6 | 77.0 |
| 10 wt % fast pyrolysis oil | 78.8 | 3.5 | 13.4 | 83.2 |

As shown in Table 4, co-processing of pyrolysis oil resulted in a decrease in liquid yield relative to processing of only vacuum resid. The yield decrease for co-processing of hydrothermal pyrolysis oil is not surprising, as the water content in hydrothermal pyrolysis oil accounts for at least a portion of the decrease. The yield decrease for fast pyrolysis oil is more significant. A yield decrease on the order of 2.0 wt % to 3.0 wt % would be expected based on the additional water present in fast pyrolysis oil. However, since the yield decrease is closer to 6.0 wt % to 7.0 wt %, some additional yield decrease may be due to interactions of the fast pyrolysis oil with the vacuum resid feed.

The more unexpected results in Table 4 are related to the selectivities for the different types of coker liquid products. In particular, the yield of light coker gas oil is substantially increased by addition of 10 wt % hydrothermal pyrolysis oil as a co-feed, with a corresponding reduction in the amount of heavy coker gas oil. In other words, co-processing of the hydrothermal pyrolysis oil resulted in a substantial increase in atmospheric distillate boiling range products while reducing the amount of atmospheric resid boiling range products. Without being bound by any particular theory, it is believed that the substantial increase in selectivity for light coker gas oil is based on the hydrothermal pyrolysis oil having an oxygen to carbon molar ratio between 0.10 to 0.24 (on a dry basis). The fast pyrolysis oil, which has an oxygen to carbon molar ratio above 0.24, provided only a modest increase in light coker gas oil yield.

It is noted that for co-processing of the hydrothermal pyrolysis oil, the absolute yield of light coker gas oil relative to the weight of the feed is increased. The decrease in total liquid product for co-processing of the hydrothermal pyrolysis oil is small, so the substantial increase in light coker gas oil yield relative to the product is large enough that the light coker gas yield is also increased relative to the feed. By contrast, due in part to the larger decrease in yield for co-processing of the fast pyrolysis oil, the absolute yield of light coker gas oil (relative to the feed) is decreased when co-processing the fast pyrolysis oil.

The benefits of co-processing of hydrothermal pyrolysis oil can be further illustrated by also considering results from co-processing of 20 wt % hydrothermal pyrolysis oil. Table 5 shows results from co-processing of both 10 wt % hydrothermal pyrolysis oil and 20 wt % hydrothermal pyrolysis oil.

TABLE 5

Co-Processing of Hydrothermal Pyrolysis Oil

|  | Liquid yield, wt % on Feed | Coker Naphtha | Light Coker Gas Oil | Heavy Coker Gas Oil |
| --- | --- | --- | --- | --- |
| 100% vacuum resid | 85.7 | 2.7 | 11.5 | 85.8 |
| 10 wt % hydrothermal pyrolysis oil | 85.1 | 3.35 | 19.6 | 77.0 |
| 20 wt % hydrothermal pyrolysis oil | 85.4 | 3.3 | 20.5 | 76.3 |

As shown in Table 5, increasing the amount of hydrothermal pyrolysis oil in the feed to 20 wt % resulted in only a modest additional increase in yield of light coker gas oil. Based on the results shown in Table 5, it appears that the increase in yield of light coker gas oil does not have a direct relationship to the amount of biomass oil in the feed. Instead, it appears that co-processing of vacuum resid with 2.5 wt % or more (or 5.0 wt % or more, or 10 wt % or more) of biomass oil having an oxygen to carbon molar ratio of 0.24 or less provides a synergistic benefit when co-processed with a conventional and/or mineral coker feedstock. This synergistic benefit results in producing 15 wt % or more of light coker gas oil while also reducing the yield of heavy coker gas oil to 80 wt % or less, relative to the total liquid yield.

To further investigate the difference in behavior between the biomass oils with lower versus higher oxygen to carbon molar ratios, a carbon-14 analysis was performed on the total liquid products. Due to the difference in $^{14}C$ content between a mineral VGO sample (formed based on biomass from long ago) and a pyrolysis oil sample (formed from recently grown biomass), the $^{14}C$ content of the total liquid products can be used to determine how much of the carbon from the pyrolysis oil entered the total liquid product. Table 6 shows the results from the $^{14}C$ analysis of the total liquid products. The "Bio-Carbon to Liquid Product" column shows the percentage of carbon from the pyrolysis oil portion of the feed (either fast pyrolysis oil or hydrothermal pyrolysis oil) that ended up in the total liquid product after the coking process.

TABLE 6

14C Analysis of Total Liquid Product

|  | O to C ratio | Bio-Carbon to Liquid Product |
| --- | --- | --- |
| 10 wt % fast pyrolysis oil | 0.40 | ~15 |
| 10 wt % hydrothermal pyrolysis oil | 0.12 | ~60 |
| 20 wt % hydrothermal pyrolysis oil | 0.12 | ~60 |

As shown in Table 6, only roughly 15% of the carbon from the fast pyrolysis oil was passed into the total liquid product. This means that the remaining 85% of the fast pyrolysis oil was either converted into coke or lost as a gas phase product (light ends, CO, or $CO_2$). This helps to explain the yield loss of total liquid product when adding the fast pyrolysis oil to the feed (shown in Table 4), as a substantial portion of the pyrolysis oil was converted into non-liquid products. Without being bound by any particular theory, it is believed that the high oxygen content of the fast pyrolysis oil resulted in substantial conversion of the fast pyrolysis oil into carbon oxides.

By contrast, roughly 60% of the carbon from the hydrothermal pyrolysis oil was passed into the total liquid product after the coking process. This substantially higher conversion of the hydrothermal pyrolysis oil into liquid product allows the yield of total liquid product to be maintained when co-processing with pyrolysis oil. Without being bound by any particular theory, it is believed that the lower yield in total liquid product from the low oxygen content pyrolysis oil is offset by increased yield of total liquid product from the vacuum gas oil, and that this increase in total liquid product yield from the vacuum gas oil results in the increase in light cycle oil in the total liquid product. It is noted that due to the lower conversion of pyrolysis oil, attempting to co-process more than ~50 wt % pyrolysis oil in the feed would result in a lowering of the total liquid product yield relative to processing vacuum gas oil alone. Even though some increase in light cycle oil yield relative to the total liquid product could be achieved, the lowering of the total liquid product yield would offset any gains in the relative yield of light cycle oil.

Additional Embodiments

Embodiment 1. A method for co-processing biomass, comprising: exposing a biomass oil comprising an oxygen to carbon molar ratio of 0.10 to 0.24 on a dry basis and a feedstock comprising a vacuum resid boiling range fraction to a catalyst in a reactor under coking conditions to form one or more liquid product fractions, the biomass oil comprising 2.5 wt % to 50 wt % of a combined weight of the biomass oil and the feedstock.

Embodiment 2. The method of Embodiment 1, wherein the biomass oil comprises a hydrogen to carbon molar ratio of 1.2 or more.

Embodiment 3. The method of any of the above embodiments, wherein the biomass oil comprises an effective molar ratio of hydrogen to carbon of 0.7 or more.

Embodiment 4. The method of any of the above embodiments, wherein the biomass oil comprises 1.0 wt % to 20 wt % of oxygen, or a combination thereof.

Embodiment 5. The method of any of the above embodiments, wherein the method further comprises converting a biomass feed under pyrolysis conditions to form the biomass oil, the pyrolysis conditions optionally comprising hydrothermal pyrolysis conditions, hydropyrolysis conditions, catalytic pyrolysis conditions, or a combination thereof.

Embodiment 6. The method of any of the above embodiments, wherein the coking conditions comprise delayed coking conditions, or wherein the coking conditions comprise fluidized coking conditions, or a combination thereof.

Embodiment 7. The method of any of the above embodiments, wherein the biomass oil comprises 10 wt % to 50 wt % of the combined weight of the biomass oil and the feedstock.

Embodiment 8. The method of any of the above embodiments, wherein the one or more liquid fractions comprise a total liquid yield of 80 wt % or more relative to the combined weight of the biomass oil and the feedstock.

Embodiment 9. The method of any of the above embodiments, wherein a yield of light coker gas oil comprises 15 wt % or more relative to a weight of the one or more liquid fractions, or wherein a yield of heavy coker gas oil comprises 80 wt % or less of a weight of the one or more liquid fractions, or a combination thereof.

Embodiment 10. The method of any of the above embodiments, wherein the biomass oil comprises 10 wt % or less of water, or wherein the biomass feed comprises 20 wt % or more of lignin, or a combination thereof.

Embodiment 11. The method of any of the above embodiments, a) wherein the biomass oil comprises 10 wppm or more of phosphorus, b) wherein the biomass oil comprises 10 wppm or more of one or more alkali metals, c) wherein the biomass oil comprises 10 wppm or more of one or more alkaline earth metals, or d) a combination of two or more of a), b), and c).

Embodiment 12. The method of any of the above embodiments, wherein the vacuum resid boiling range fraction comprises a mineral vacuum resid boiling range fraction.

Embodiment 13. The method of any of the above embodiments, wherein the biomass oil comprises an oxygen to carbon molar ratio of 0.12 to 0.20 on a dry basis.

Embodiment 14. A liquid product comprising the one or more liquid product fractions made according to the method of any of Embodiments 1-13.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for co-processing biomass, comprising: exposing a biomass oil comprising an oxygen to carbon molar ratio of 0.10 to 0.24 on a dry basis and a feedstock comprising a vacuum resid boiling range fraction to coking conditions to form one or more liquid product fractions, the biomass oil comprising 2.5 wt % to 50 wt % of a combined weight of the biomass oil and the feedstock, the biomass oil comprising water.

2. The method of claim 1, wherein the biomass oil comprises a hydrogen to carbon molar ratio of 1.2 or more.

3. The method of claim 1, wherein the biomass oil comprises an effective molar ratio of hydrogen to carbon of 0.7 or more.

4. The method of claim 1, wherein the biomass oil comprises 1.0 wt % to 20 wt % of oxygen.

5. The method of claim 1, wherein the method further comprises converting a biomass feed under pyrolysis conditions to form the biomass oil.

6. The method of claim 5, wherein the pyrolysis conditions comprise hydrothermal pyrolysis conditions, hydropyrolysis conditions, catalytic pyrolysis conditions, or a combination thereof.

7. The method of claim 1, wherein the coking conditions comprise delayed coking conditions.

8. The method of claim 1, wherein the coking conditions comprise fluidized coking conditions.

9. The method of claim 1, wherein the biomass oil comprises 10 wt % to 50 wt % of the combined weight of the biomass oil and the feedstock.

10. The method of claim 1, wherein the one or more liquid fractions comprise a total liquid yield of 80 wt % or more relative to the combined weight of the biomass oil and the feedstock.

11. The method of claim 1, wherein a yield of light coker gas oil comprises 15 wt % or more of the one or more liquid fractions.

12. The method of claim 1, wherein a yield of heavy coker gas oil comprises 80 wt % or less of the one or more liquid fractions.

13. The method of claim 1, wherein the biomass oil comprises 10 wt % or less of water.

14. The method of claim 1, wherein the biomass feed comprises 20 wt % or more of lignin.

15. The method of claim 1, wherein the biomass oil comprises 10 wppm or more of phosphorus.

16. The method of claim 1, wherein the biomass oil comprises 10 wppm or more of one or more alkali metals.

17. The method of claim 1, wherein the biomass oil comprises 10 wppm or more of one or more alkaline earth metals.

18. The method of claim 1, wherein the vacuum resid boiling range fraction comprises a mineral vacuum resid boiling range fraction.

19. The method of claim 1, wherein the biomass oil comprises an oxygen to carbon molar ratio of 0.12 to 0.20 on a dry basis.

* * * * *